(12) United States Patent
Trottier

(10) Patent No.: US 12,405,239 B2
(45) Date of Patent: Sep. 2, 2025

(54) PHOTOTHERMAL ANALYSIS OF A PART OF SOLID MATERIAL

(71) Applicant: OFFICE NATIONAL D'ETUDES ET DE RECHERCHES AÉROSPATIALES, Palaiseau (FR)

(72) Inventor: Camille Trottier, Arpajon (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 752 days.

(21) Appl. No.: 17/774,066

(22) PCT Filed: Oct. 28, 2020

(86) PCT No.: PCT/EP2020/080306
§ 371 (c)(1),
(2) Date: May 3, 2022

(87) PCT Pub. No.: WO2021/089383
PCT Pub. Date: May 14, 2021

(65) Prior Publication Data
US 2022/0381717 A1 Dec. 1, 2022

(30) Foreign Application Priority Data
Nov. 4, 2019 (FR) ....................................... 1912330

(51) Int. Cl.
*G01N 25/72* (2006.01)
*G01J 5/00* (2022.01)
*G06T 7/00* (2017.01)

(52) U.S. Cl.
CPC ............ *G01N 25/72* (2013.01); *G01J 5/0003* (2013.01); *G06T 7/0004* (2013.01); *G01J 2005/0077* (2013.01)

(58) Field of Classification Search
CPC ..... G01N 25/72; G06T 7/0004; G06T 7/0008; G01J 2005/0077
See application file for complete search history.

(56) References Cited

U.S. PATENT DOCUMENTS

| 5,711,603 A | 1/1998 | Ringermacher |
| 6,343,874 B1 | 2/2002 | Legrandjacques et al. |

(Continued)

FOREIGN PATENT DOCUMENTS

| CN | 104364605 A | 2/2015 |
| FR | 3 020 678 | 11/2015 |

(Continued)

OTHER PUBLICATIONS

Office Action, issued in Japanese Patent Application No. 2022-526190 dated Mar. 5, 2024.

(Continued)

*Primary Examiner* — Benjamin O Dulaney
(74) *Attorney, Agent, or Firm* — NIXON & VANDERHYE

(57) ABSTRACT

A method of photothermal analysis of a solid piece includes injecting heat into a region of a surface of the piece, called heating region, capturing a thermal analysis image of a detection region which is distinct from the heating region, then subtracting a reference image from the thermal analysis image. The reference image corresponds to a thermal emission distribution as caused by the injected heat for a case where the surface portion of the piece is without defects. Such method makes it possible to reduce an analysis cycle time for the piece, and to reduce a signal-to-noise ratio of images capable of revealing defects present in the surface portion of the piece.

20 Claims, 2 Drawing Sheets

(56) References Cited

U.S. PATENT DOCUMENTS

| | | | |
|---|---|---|---|
| 6,419,387 B1* | 7/2002 | Legrandjacques | G01J 5/10 |
| | | | 374/57 |
| 9,903,828 B2 | 2/2018 | Caulier et al. | |
| 2008/0212072 A1 | 9/2008 | Piriou | |
| 2015/0144798 A1 | 5/2015 | Shi et al. | |
| 2017/0067839 A1* | 3/2017 | Caulier | G01J 5/10 |
| 2018/0003648 A1 | 1/2018 | Nicolaides et al. | |
| 2019/0114755 A1* | 4/2019 | Lee | G01J 5/0007 |
| 2019/0250038 A1 | 8/2019 | Jeys et al. | |
| 2019/0289227 A1* | 9/2019 | Hirosawa | H04N 23/23 |
| 2019/0339159 A1* | 11/2019 | Israelsen | G06T 7/001 |
| 2021/0071954 A1* | 3/2021 | Israelsen | G06T 19/20 |

FOREIGN PATENT DOCUMENTS

| | | |
|---|---|---|
| JP | H10142179 A | 5/1998 |
| JP | 2000028560 A | 1/2000 |
| JP | 2008539404 A | 11/2008 |
| KR | 20160123337 A | 10/2016 |
| KR | 10-2017-0126725 | 11/2017 |
| WO | 98/39641 | 9/1998 |

OTHER PUBLICATIONS

International Search Report for PCT/EP2020/080306 mailed Feb. 2, 2021, 6 pages.

Written Opinion of the ISA for PCT/EP2020/080306 mailed Feb. 2, 2021, 7 pages.

Liu et al., "Linear laser fast scanning thermography NDT for artificial disbond defects in thermal barrier coatings", Optics Express 31789, vol. 25, No. 25, Dec. 6, 2017, 12 pages.

Pawar et al., "Applying the heat conduction-based 3D normalization and thermal tomography to pulsed infrared thermography for defect Characterization in composite materials", International Journal of Heat and Mass Transfer, Vol. 94, Nov. 30, 2015, pp. 56-65.

Sommier et al., "Coupling Pulsed Flying Spot technique with robot automation for industrial thermal characterization of complex shape composite materials", NDT & E International, vol. 102, Nov. 22, 2018, pp. 175-179.

Office Action, issued in Chinese Patent Application No. 202080076070.9 dated Apr. 16, 2025.

Office Action, issued in Korean Patent Application No. 10-2022-7015467 dated Mar. 26, 2025.

\* cited by examiner

PHOTOTHERMAL ANALYSIS OF A PART OF SOLID MATERIAL

CROSS-REFERENCE TO RELATED APPLICATIONS

This application is the U.S. national phase of International Application No. PCT/EP2020/080306 filed Oct. 28, 2020 which designated the U.S. and claims priority to French Patent Application No. 1912330 filed Nov. 4, 2019, the entire contents of each of which are hereby incorporated by reference.

BACKGROUND OF THE INVENTION

Field of the Invention

This description relates to a photothermal analysis method and assembly for revealing defects present on the surface of a piece of solid material.

Description of the Related Art

It is known revealing at least one defect, which is present in a surface portion of a piece composed of at least one solid material, by using a method of photothermal analysis.

Such method comprises the following steps:

/1/ injecting heat into a first region of the surface portion of the piece, called heating region, then, after a period during which some of the injected heat has diffused into another region of the surface portion of the piece, which is called detection region and which is distinct from the heating region, capturing at least one thermal image, called analysis image, of the detection region; and /2/ subtracting a reference image from the analysis image, at least for a portion of the analysis image which corresponds to the detection region, in order to obtain a revealing image which shows at least one defect present in this detection region.

In such method known from the prior art, for example from document WO 98/39641, step /1/ is carried out several times, each time moving the heating region within the surface portion of the piece so as to scan this surface portion with successive detection regions. The detection region is moved in the surface portion of the piece together with the heating region, and a new analysis image is captured each time step /1/ is repeated. Step /2/ is also repeated, for each execution of step /1/. According to document WO 98/39641, the same surface portion to be analyzed is scanned twice along the same scanning path, but both times are in opposite travel directions on the scanning path. Then, the analysis images relating to a same detection region, which have each been captured for a different travel direction on the scanning path, are subtracted from each other to form the revealing image. In other words, the analysis image that was captured for the first scan direction is used as the reference image for the analysis image captured for the second scan direction. The revealing image thus obtained reveals some of the defects which are present in the surface portion of the piece, for example in the form of temperature differences located to either side of each defect, with the sign of the temperature difference depending on the side of the defect. Indeed, heat is accumulated to a somewhat greater extent between the defect and the heating region which is moved towards this defect for each direction of the scan, if the defect causes a slightly higher local thermal resistance in the piece.

Such method is efficient, but has the drawback of requiring that the surface portion of the piece be scanned twice in order to obtain analysis images that correspond to both opposite scanning directions. This results in a long analysis cycle time for each piece, difficult to reconcile with a high production rate for mass-produced pieces.

SUMMARY OF THE INVENTION

Based on this situation, an object of the invention consists in making it possible to check pieces by a method of photothermal analysis, with a shorter analysis cycle time for each piece.

Another object of the invention is to provide, by photothermal analysis, revealing images which have signal-to-noise ratio values higher than those provided by known methods of the prior art.

To achieve at least one of these or other objects, a first aspect of the invention proposes a new method of photothermal analysis which comprises steps /1/ and /2/ as described above, but the reference image which is subtracted from the analysis image corresponds to a thermal emission distribution in the detection region, as caused by at least some of the heat injected into the surface portion of the piece, for a case where the surface portion of the piece is without defects in the detection region. Due to using such reference image, a single analysis image is sufficient for each detection region, so the cycle time required to analyze one piece is substantially divided by two. This saving in the analysis cycle time is all the more significant when the surface portion to be analyzed is large and requires a large number of contiguous detection regions in order to be fully covered.

Furthermore, since the method of the invention only requires capturing a single analysis image for each detection region, each revealing image is affected by a signal-to-noise ratio which is reduced compared to methods where each revealing image results from a combination of several analysis images.

In general for the invention, the detection region which is imaged in the analysis image may comprise the heating region, but preferably it may be off-centered or shifted relative to this heating region, contiguous to or spaced apart from it within the surface portion to be analyzed.

Again in general for the invention, heat may be injected into the heating region by means of a laser beam directed onto this heating region for a given irradiation time. Such method of supplying heat is particularly simple and quick to implement. It is therefore suitable for obtaining a short analysis cycle time for each piece.

In preferred implementations of the invention, the reference image which is subtracted from the analysis image may result from a search for best match between the analysis image and a configured model of thermal emission distribution which is used to define the case where the surface portion of the piece is without defects in the detection region.

It is possible that this model of thermal emission distribution used to define the case where the surface portion of the piece is without defects in the detection region, may correspond to a steady state of heat diffusion within this detection region. In particular, it may be a steady state of heat diffusion described by an equation providing temperature values as a function of two geometric coordinates defined within the surface portion of the piece. This equation may in particular comprise a Gaussian function of at least one of the two geometric coordinates, the Gaussian function being multiplied by a constant amplitude factor, and a constant offset term being added thereto.

Alternatively, the reference image which is subtracted from the analysis image may be obtained from a thermal image of a region of the surface of the piece which is considered free of defects, called reference region. In this case, this thermal image intended to serve as a reference image has been captured after an amount of heat has been injected into the piece close to the reference region or into this reference region, in a configuration of the heating region and detection region which is identical to that of step /1/.

Preferably, the method is implemented by running a scan in the surface portion to be analyzed, in order to be able to be applied efficiently to pieces which have dimensions greater than those of the detection region. In this case:

step /1/ is executed several times, each time moving the heating region within the surface portion of the piece, so as to perform a scan in this surface portion with successive positions of the heating region, and a new analysis image is captured for each position of the heating region, the detection region being moved within the surface portion of the piece together with the heating region, so that any location in the surface portion of the piece is contained at least once in the detection region; and step /2/ is repeated for each execution of step /1/, each time using a reference image which is assigned to the detection region as located in the surface portion of the piece at this execution of step /1/.

The reference images assigned to distinct positions of the detection region in the surface portion to be analyzed, for different repetitions of steps /1/ and /2/ and in order to obtain revealing images which separately concern these distinct detection regions, may be the same or different.

For such implementations of the invention with scanning of the surface portion to be analyzed, for each execution of step /1/ the detection region may be shifted downstream relative to the heating region, according to a direction of movement of this heating region during scanning. The method thus has higher sensitivity compared to a configuration which causes a more gradual heating in the detection region.

Again for such implementations with scanning, the method may further comprise the following step:

/3/ using splicing, superimposing, averaging, and/or smoothing operations applied to several of the revealing images as obtained during multiple executions of step /2/, reconstructing an overall image of the entire surface portion of the piece, intended to show defects present in all of this surface portion.

The overall image allows a rapid and efficient visual verification of the entire surface portion.

In general, the method of the invention may be used for all types of pieces composed of at least one solid material, including a metallurgical piece, a piece which is at least partly composed of a ceramic material, or a piece which is at least partly composed of a composite material. In particular, it may advantageously be used to analyze a blade of a turbojet engine or fan, a blade of an energy production turbine, a piece closing off or sealing a vessel of a power plant, or a mechanical piece for the transmission of movement.

The piece may optionally comprise a solid substrate and a coating which is carried by this substrate at least in the surface portion to be analyzed. The method can then be used to reveal any cracks that may be present in the coating.

A second aspect of the invention proposes a photothermal analysis assembly, for revealing at least one defect present in a surface portion of a piece composed of at least one solid material, this assembly comprising:

a heat supplying means, which is suitable for injecting heat into a first region of the surface portion of the piece, called heating region;

means for capturing thermal images, which are arranged to capture thermal images, called analysis images, of another region of the surface portion of the piece, called detection region and which is distinct from the heating region, the means for capturing thermal images being controlled to capture each analysis image after a period during which some of the heat injected by the heat supplying means has diffused from the heating region into the detection region;

an image processing unit, suitable for subtracting a reference image from each analysis image, at least for a portion of this analysis image which corresponds to the detection region, in order to obtain a revealing image which shows at least one defect present in this detection region; and optionally, scanning means which are suitable for moving the heating region within the surface portion of the piece, so as to perform a scan in this surface portion with successive positions of the heating region, the detection region being moved within the surface portion of the piece together with the heating region, so that any location in the surface portion of the piece is contained at least once in the detection region.

The image processing unit is adapted so that, for each analysis image captured, the reference image subtracted therefrom corresponds to a thermal emission distribution in the detection region, as caused by at least some of the heat injected into the surface portion of the piece, for a case where the surface portion of the piece is without defects in the detection region.

Such photothermal analysis assembly is suitable for implementing a method in accordance with the first aspect of the invention, possibly including the preferred implementations and optional improvements described above.

BRIEF DESCRIPTION OF THE DRAWINGS

The features and advantages of the invention will become more clearly apparent from the following detailed description of some examples of non-limiting implementations, with reference to the appended figures in which.

DESCRIPTION OF THE PREFERRED EMBODIMENTS

For clarity sake, the dimensions of the elements represented in these figures correspond neither to actual dimensions nor to actual dimension ratios. Moreover, some of these elements are only represented symbolically.

Figure 1:
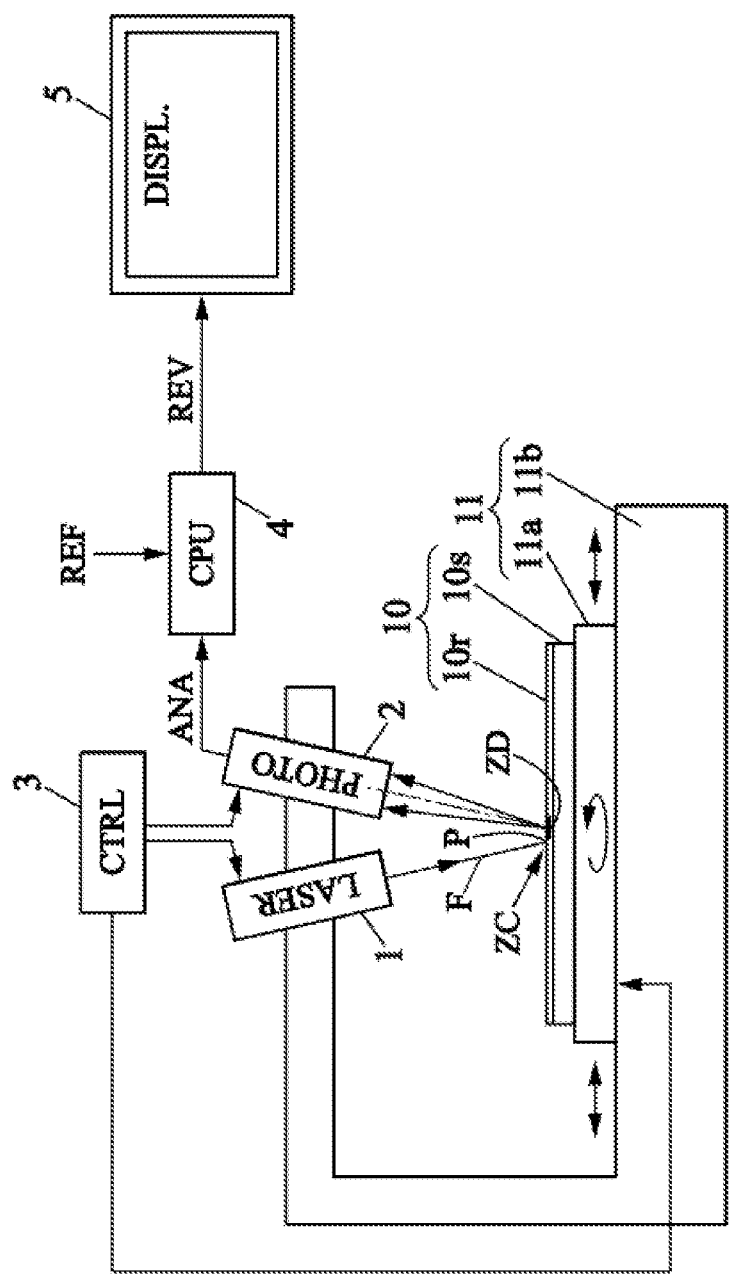
FIG. 1 is a block diagram of a photothermal analysis assembly in accordance with the invention.

In accordance with [FIG. 1], a photothermal analysis assembly which is intended to reveal defects that may be present in the surface of a piece 10, comprises a heat supplying means 1 and means of capturing thermal images 2. The heat supplying means 1 may be based on a laser source, in which the beam F is directed towards a region of the surface of the piece 10 which is intended to locally receive a flow of energy. The wavelength of the laser source is selected so that the laser radiation is essentially absorbed by the piece 10 in order to be converted into a heat flux which then diffuses within the piece 10. This may be for example a $CO_2$ laser producing radiation with a wavelength of 10.6 µm (micrometer). The heat flux thus generated in the piece 10 causes a local increase in temperature at its surface, at a distance from the region which received the laser beam F. The means for capturing thermal images 2, denoted PHOTO, have sufficient sensitivity to detect local increases in the temperature of the surface of the piece 10, as generated by the heat supplying means 1. For example, the means for capturing thermal images 2 may be composed of a microbolometer image sensor, which is associated with focusing optics arranged to optically couple a detection region within the surface of the piece 10 with the sensitive surface of the image sensor.

A controller 3, denoted CTRL, may be provided for controlling the heat supplying means 1 and the means for capturing thermal images 2 in a coordinated manner. A sequence of photothermal analyses then comprises activating the heat supplying means 1 in order to inject an amount of heat into a given region of the surface of the piece 10, called heating region and denoted ZC, and to capture a thermal image of a detection region, denoted ZD, which is located within the surface of the piece 10 and close to the heating region ZC. The heating region ZC may correspond to a cross-section of the laser beam F around a target point P in the surface of the piece 10. The thermal image of the detection region ZD is captured after a given duration which starts with activation of the heat supplying means 1, in order to allow the heat to diffuse from the heating region ZC into the diffusion region ZD. This duration, which may be between 0.01 s (second) and 0.5 s for example, is controlled by the controller 3. The thermal image which is thus captured by the means 2 is denoted ANA in [FIG. 1], and is referred to as analysis image in the general part of this description. It reproduces spatial variations of the thermal emission radiation produced by the piece 10 in the detection region ZD, subsequent to the heating in region ZC. These spatial variations result from a diffusion of heat into the piece 10, from the heating region ZC and into the detection region ZD, which is combined with disturbances caused by any defects possibly present in the piece 10 between regions ZC and ZD and within region ZD. The heat supplying means 1 and the means for capturing thermal images 2 are oriented so that the detection region ZD is close to the heating region ZC in the surface of the piece 10. Optionally, the detection region ZD may contain the heating region ZC, if no saturation of the infrared image sensor occurs. However, preferably, the detection region ZD and the heating region ZC are contiguous or spaced apart from each other with a small separation gap. The dimensions of the detection region ZD may be approximately 6 mm (millimeter)×4 mm, and the heating region ZC may be a disc 1 mm in diameter.

According to the invention, an image processing unit 4 is suitable for comparing the analysis image ANA with a reference image. The image processing unit 4 may be composed of a processor denoted CPU, connected for receiving at input the analysis image ANA as delivered by the means for capturing thermal images 2, and also for receiving a reference thermal image denoted REF and called reference image. The unit 4 is designed or programmed to calculate a differential image, which results from the point-to-point subtraction of intensity values of the reference image REF from the intensity values of the analysis image ANA. When the reference image REF corresponds to a diffusion of heat within the piece 10 in the absence of defects in the detection region ZD, the differential image reveals defects of the piece 10 which are present therein with high contrast. For this reason, in the general part of this description the differential image has been called revealing image for showing at least one defect present in the detection region ZD, and has been denoted REV in [FIG. 1].

We now present different ways to obtain the reference image REF. In general, it is advantageous for the reference image REF to be able to be adjusted to the analysis image ANA according to at least one parameter. Such adjustment parameters may comprise for example a constant multiplicative factor and an additive term which is also constant, these being applied to the set of image point intensity values of the reference image REF. These parameters may in particular allow eliminating deviations in the ambient temperature value and in the value of the thermal power injected into the heating region ZC, between experimental circumstances which correspond to the capturing of the analysis image ANA and conditions which correspond to the reference image REF. Additional adjustment parameters may also be used additionally or alternatively to adjust the reference image REF to the analysis image ANA, such as at least one characteristic length of temperature decrease in the piece 10. Such a characteristic length of temperature decrease can allow eliminating the effects of differences in heat capacity and thermal resistance values which could exist between the experimental circumstances of the capture of the analysis image ANA and the conditions which correspond to the reference image REF. In general, a best-match algorithm may be used to adjust the parameters of the reference image REF according to the analysis image ANA.

According to first possible implementations of the invention, the reference image REF may result from a model which describes the thermal emission distribution in the detection region ZD, as caused by the heat injected into the heating region ZC, and which corresponds to a steady state of heat diffusion. In a known manner, such a steady-state model may correspond to an equation of temperature distribution in the detection region ZD of the type:

$$T(x, y) = A \cdot e^{-\left[\frac{(x-x_0)^2}{\sigma_x^2} + \frac{(y-y_0)^2}{\sigma_y^2}\right]} + B,$$

where T denotes the local temperature in the detection region ZD, A is a multiplicative adjustment factor, B is an additive adjustment term, x and y are two Cartesian coordinates defined in the surface of the piece 10, $e^{(\cdot)}$ denotes the basic exponential function e, $\sigma_x$ and $\sigma_y$ are two standard deviations along the coordinates x and y respectively, and $x_0$ and $y_0$ are translational positioning values of the thermal distribution model parallel to the surface of the piece 10. The values of the standard deviations $\sigma_x$ and $\sigma_y$, as well as the values of $x_0$ and $y_0$, can be adjusted with respect to the analysis image ANA, in addition to the parameters A and B. In a known manner, such a temperature distribution is a parameterized Gaussian function of the Cartesian coordinates x and y.

Other models may be used alternatively to provide the reference image REF. In particular, such other models may take into account the presence of a layer of given thickness on the surface of the piece 10, which consists of a coating material different from that of a base portion of the piece 10. Other models may also take into account the presence in the detection region ZD of an interface, which is oriented perpendicularly or obliquely to the surface of the piece 10, between two different materials which constitute adjacent portions of the piece 10. Yet other models may take into account variable shapes of the heating region ZC, and/or variable positions of the heating region ZC relative to the detection region ZD.

In other possible implementations of the invention, the reference image REF may be a thermal image captured with the image capturing means 1 for the piece 10 to be analyzed, in a portion of the surface thereof which is assumed to be free of defects. Such a portion of the surface which is assumed to be free from defects has been called reference region in the general part of this description. An advantage of such other implementations lies in the fact that the reference image REF can correspond to experimental parameters such as those used for the analysis image ANA. In particular, the amount of energy injected into the heating region ZC, the ambient temperature, the shape of the heating region ZC, the relative arrangement of the heating ZC and detection ZD regions, the material of the piece 10, the possible presence of a coating layer on the surface of this piece, etc., can thus be identical between the analysis image ANA and the reference image REF.

The revealing image REV as calculated by the image processing unit 4 may be displayed on a screen 5, denoted DISPL, for viewing by a control operator. It reveals aspects of the piece 10 within the detection region ZD which alter the heat diffusion in comparison to the diffusion behavior that is effective for the reference image REF. Such aspects correspond to defects of the piece 10, and may be cracks present in its surface, inclusions of different phases, cracking in a surface coating of the piece 10, etc. Optionally, to further highlight such defects, a high-pass type image filter may be applied to the revealing image REV before the image is displayed on the screen 5. For example, a Sobel-type image filter may be used for this purpose.

Such method of photothermal analysis may be particularly suitable for verifying that the piece 10 does not have any defects likely to cause failures during its subsequent use. For example, the piece 10 may be a blade of an aviation turbojet compressor, which is composed of a solid substrate 10s covered with a thin layer 10r. The function of the layer 10r may be to protect against corrosion. Then, the method of photothermal analysis of the invention may be used in particular to check the level of cracking in the layer 10r.

Figure 2:
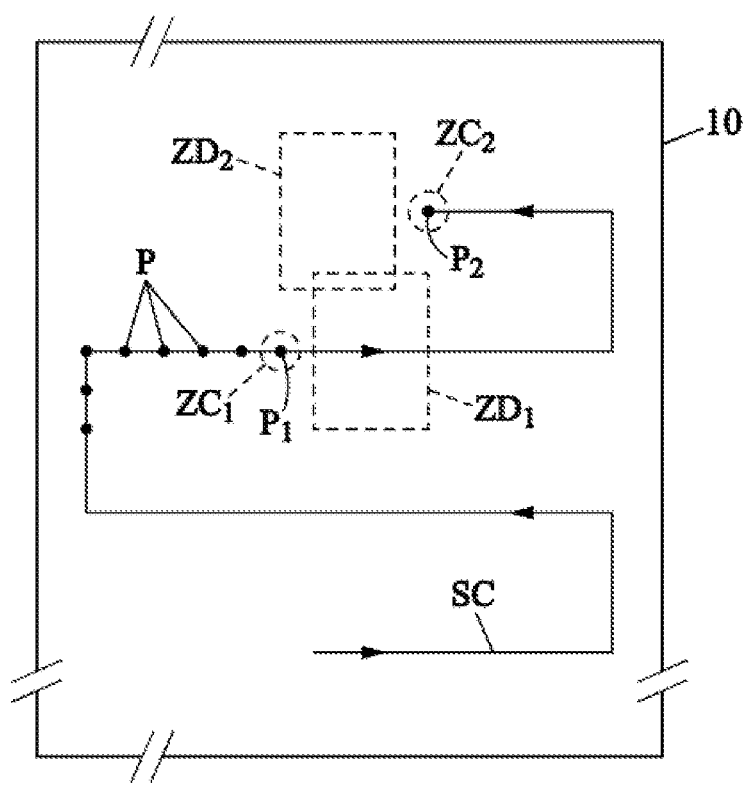
FIG. 2 shows a possible configuration for scanning a piece to be analyzed using a method according to the invention.

In order to quickly check a surface portion of the piece 10 which may have dimensions greater than those of the detection region ZD as described so far, corresponding to a single sequence of injecting heat and capturing an analysis image, the surface portion of the piece 10 to be analyzed may be scanned along a scanning path SC (see [FIG. 2]). The central points of successively adopted heating regions follow this scanning path SC. The relative positions and orientations of the heat supplying means 1 and the means for capturing thermal images 2 are preferably constant, but movable relative to the piece 10. According to one possible configuration of the photothermal analysis assembly, the piece 10 may be mounted on a support 11a which is movable relative to a base 11b of the assembly, the base being fixed relative to means 1 and 2. The piece 10 can thus be moved parallel to its surface to be analyzed, in two mutually perpendicular directions, and rotated about an axis which is perpendicular to these two directions. The scanning means 11 thus comprise the movable support 11a, the base 11b, and a part of the controller 3 which is dedicated to controlling the movement of the piece 10 in a manner that is synchronized with the triggering of the means 1 and 2.

FIG. 2 is an elevation view of the portion to be analyzed of the surface of the piece 10, showing the scanning path SC which is designed so that all locations of the surface portion to be analyzed are contained at least once within a detection region. The central point of a heating region can follow the scanning path SC in the surface of the piece 10, for successive positions of the piece 10, the sequence of static photothermal analysis described above being carried out at each position. In this case, the heat supplying means 1 can operate intermittently and periodically, for example emitting a laser pulse towards the surface of the piece 10 for each position thereof. The points P indicated along the scanning path SC indicate possible successive positions for the center of the heating regions. In order to reduce the analysis cycle time of the piece 10, these positions P may be achieved chronologically in continuous order along the scanning path SC, corresponding to the arrows indicated in [FIG. 2]. It is then particularly advantageous, in order to increase the contrast of the analysis images ANA captured, and the contrast of the revealing images REV calculated according to the invention, at the rate of one revealing image REV for each position of the heating region in the surface portion to be analyzed, that the detection region be located downstream of the heating region relative to the scanning direction. Put another way, one and same location in the surface to be analyzed preferably appears first in a detection region which is imaged by the means 2, before being used as a heating region targeted by the means 1, or before being near such a heating region. In [FIG. 2], $P_1$ designates a central point of a heating region on the scanning path SC, corresponding to heating region $ZC_1$ and detection region $ZD_1$. The latter is offset relative to heating region $ZC_1$ in the travel direction indicated by the arrow on the scanning path SC for the path segment which contains point $P_1$. Similarly, $P_2$ designates another central point of a heating region on the scanning path SC, which is achieved later than point $P_1$, corresponding to heating region $ZC_2$ and detection region $ZD_2$. Detection region $ZD_2$ is then shifted relative to heating region $ZC_2$ in the travel direction indicated by the arrow on the scanning path SC concerning the path segment which contains point $P_2$.

The scanning path SC is preferably designed so that the entire surface portion to be analyzed of the piece 10 is covered by the detection regions associated with all the successive points P. Thus, grouping all revealing images REV can allow reconstructing the entire surface portion to be analyzed of the piece 10, in a comprehensive visualization image intended for displaying on the screen 5. Optionally, overlapping strips of different detection regions may exist between neighboring meanders in the scanning path SC. Image splice operations may be used between individual revealing images REV, so that the overall image contains no artifacts due to its being produced in separate parts. In a manner known in the field of image processing, such image splicing operations may comprise corrections of average intensity levels of the individual revealing images, relative displacements of neighboring revealing images to ensure continuity of image patterns across the edges of individual images, smoothing of intensity levels of image points perpendicularly to the edges of individual images, etc.

The invention therefore makes it possible to check the entire surface portion of the piece 10 by performing only one scan of this surface portion. The duration of the verification, called analysis cycle time, is therefore reduced in comparison to a method of photothermal analysis which requires running the scanning path twice, in opposite travel directions. When the analysis cycle time of the piece 10 is mainly due to scanning, rather than to mounting the piece 10 on the movable support 11*a*, the savings in analysis cycle time can be on the order of a factor of two.

Furthermore, given that each revealing image REV only requires capturing a single analysis image ANA in a method according to the invention, each revealing image REV has a signal-to-noise ratio value which is reduced in comparison to the methods of the prior art in which each revealing image is deduced from a difference between two analysis images which concern the same detection region. Indeed, in these prior methods, each of the two analysis images which are combined together, is affected by a random thermal imaging noise which is independent of that of the other analysis image. When the signal-to-noise ratio of the revealing image, denoted SNR, is expressed in decibels (dB) according to the formula $$\langle RSB \rangle = 20 \cdot \log_{10}\left(\frac{S}{B}\right),$$

where S is the maximum amplitude of the variation in intensity of an image point at a crack in the surface of the piece 10, and B is the maximum amplitude of the thermal imaging noise as measured in a reference region of the surface of the piece 10 considered to be free of defects. For a piece to be analyzed which is composed of a solid substrate covered with a thin layer of protection against corrosion, an improvement in the signal-to-noise ratio by a factor of 2.8 to 6.3 has been obtained.

It is understood that the invention may be reproduced by modifying secondary aspects of the implementations described in detail above, while retaining at least some of the advantages cited. In particular, the heating region ZC may have any shape, in particular the shape of a rectilinear segment which is oriented perpendicularly to the scanning path SC. Similarly, the shape of the detection region ZD is not limited to a rectangular parallelepiped which corresponds to the array of the thermal image sensor. For example, the detection region ZD may have the shape of a half-disc whose focus is superimposed on the center of the heating region ZC, and may be oriented downstream of the latter relative to the direction of travel on the scanning path SC. In addition, all numerical values that have been cited are for illustrative purposes only, and may be changed according to the application concerned.

The invention claimed is:

1. A method of photothermal analysis of a piece which is composed of at least one solid material, the method being intended to reveal whether at least one defect is present in a surface portion of the piece, and comprising the following steps:
/1/ injecting heat into a first region of the surface portion of the piece, called heating region, then, after a period during which some of the injected heat has diffused into another region of the surface of the piece, which is called detection region and which is distinct from the heating region, capturing at least one thermal image, called analysis image, of the detection region; and
/2/ subtracting a reference image from the analysis image, at least for a portion of said analysis image which corresponds to the detection region, in order to obtain a revealing image which shows whether at least one defect is present in said detection region,
wherein, for each analysis image captured, the reference image which is subtracted from said analysis image corresponds to a thermal emission distribution in the detection region, as caused by at least some of the heat injected into the surface portion of the piece, for a case where said surface portion of the piece is without defects in the detection region,
and wherein the reference image which is subtracted from the analysis image results from a search for best match between said analysis image and a configured model of thermal emission distribution which is used to define the case where the surface portion of the piece is without defects in the detection region.

2. The method according to claim 1, wherein heat is injected into the heating region by means of a laser beam directed onto said heating region for a given irradiation time.

3. The method according to claim 2, wherein the model of thermal emission distribution used to define the case where the surface portion of the piece is without defects in the detection region, corresponds to a steady state of heat diffusion within said detection region.

4. The method according to claim 2, wherein:
step /1/ is executed several times, each time moving the heating region within the surface portion of the piece, so as to perform a scan in said surface portion with successive positions of the heating region, and a new analysis image is captured for each position of said heating region, the detection region being moved within the surface portion of the piece together with the heating region, so that any location in the surface portion of the piece is contained at least once in the detection region; and
step /2/ is repeated for each execution of step /1/, each time using a reference image which is assigned to the detection region as located in the surface portion of the piece at said execution of step /1/.

5. The method according to claim 2, wherein the piece is a metallurgical piece, a piece at least partly composed of a ceramic material, or a piece at least partly composed of a composite material.

6. The method according to claim 1, wherein the model of thermal emission distribution used to define the case where the surface portion of the piece is without defects in the detection region, corresponds to a steady state of heat diffusion within said detection region.

7. The method of claim 6, wherein the steady state of heat diffusion is described by an equation providing temperature values as a function of two geometric coordinates defined within the surface portion of the piece, said equation comprising a Gaussian function of at least one of the two geometric coordinates, multiplied by a constant amplitude factor, and with a constant offset term being added thereto.

8. The method according to claim 6, wherein:
step /1/ is executed several times, each time moving the heating region within the surface portion of the piece, so as to perform a scan in said surface portion with successive positions of the heating region, and a new analysis image is captured for each position of said heating region, the detection region being moved within the surface portion of the piece together with the heating region, so that any location in the surface portion of the piece is contained at least once in the detection region; and
step /2/ is repeated for each execution of step /1/, each time using a reference image which is assigned to the detection region as located in the surface portion of the piece at said execution of step /1/.

9. The method according to claim 6, wherein the piece is a metallurgical piece, a piece at least partly composed of a ceramic material, or a piece at least partly composed of a composite material.

10. The method according to claim 1, wherein:
step /1/ is executed several times, each time moving the heating region within the surface portion of the piece, so as to perform a scan in said surface portion with successive positions of the heating region, and a new analysis image is captured for each position of said heating region, the detection region being moved within the surface portion of the piece together with the heating region, so that any location in the surface portion of the piece is contained at least once in the detection region; and
step /2/ is repeated for each execution of step /1/, each time using a reference image which is assigned to the detection region as located in the surface portion of the piece at said execution of step /1/.

11. The method according to claim 10, wherein, for each execution of step /1/, the detection region is shifted downstream relative to the heating region, according to a direction of movement of said heating region during scanning.

12. The method according to claim 11, further comprising the following step:
/3/ using splicing, superimposing, averaging, and/or smoothing operations applied to several of the revealing images as obtained during the multiple executions of step /2/, reconstructing an overall image of the entire surface portion of the piece, intended to show defects present in all of said surface portion.

13. The method according to claim 10, further comprising the following step:
/3/ using splicing, superimposing, averaging, and/or smoothing operations applied to several of the revealing images as obtained during the multiple executions of step /2/, reconstructing an overall image of the entire surface portion of the piece, intended to show defects present in all of said surface portion.

14. The method according to claim 10, wherein the piece is a metallurgical piece, a piece at least partly composed of a ceramic material, or a piece at least partly composed of a composite material.

15. The method according to claim 1, wherein the piece is a metallurgical piece, a piece at least partly composed of a ceramic material, or a piece at least partly composed of a composite material.

16. The method of claim 15, wherein the piece is a blade of a turbojet engine or fan, a blade of an energy production turbine, a piece closing off or sealing a vessel of a power plant, or a mechanical piece for transmission of movement.

17. The method according to claim 1, wherein the piece comprises a solid substrate and a coating which is carried by said substrate at least in the surface portion of said piece, and the method is used to reveal cracks present in the coating.

18. A photothermal analysis assembly, for revealing whether at least one defect is present in a surface portion of a piece composed of at least one solid material, the assembly comprising:
a heat supplying means, suitable for injecting heat into a first region of the surface portion of the piece, called heating region;
means for capturing thermal images, arranged to capture thermal images, called analysis images, of another region of the surface portion of the piece, which is called detection region and which is distinct from the heating region, the means for capturing thermal images being controlled to capture each analysis image after a period during which some of the heat injected by the heat supplying means has diffused from the heating region into the detection region; and
an image processing unit, suitable for subtracting a reference image from each analysis image, at least for a portion of said analysis image which corresponds to the detection region, in order to obtain a revealing image which shows whether at least one defect is present in said detection region;
wherein the image processing unit is adapted so that, for each analysis image captured, the reference image which is subtracted from said analysis image corresponds to a thermal emission distribution in the detection region, as caused by at least some of the heat injected into the surface portion of the piece, for a case where said surface portion of the piece is without defects in the detection region,
and wherein the reference image which is subtracted from the analysis image results from a search for best match between said analysis image and a configured model of thermal emission distribution which is used to define the case where the surface portion of the piece is without defects in the detection region.

19. A method of photothermal analysis of a piece which is composed of at least one solid material, the method being suitable to reveal whether at least one defect is present in a surface portion of the piece, the method comprising:
providing the assembly according to claim 9;
utilizing the assembly, injecting heat into a first region of the surface portion of the piece, called heating region, then, after a period during which some of the injected heat has diffused into another region of the surface of the piece, which is called detection region and which is distinct from the heating region, capturing at least one thermal image, called analysis image, of the detection region; and
utilizing the assembly, subtracting a reference image from the analysis image, at least for a portion of said analysis image which corresponds to the detection region, in order to obtain a revealing image which shows whether at least one defect is present in said detection region,
wherein, for each analysis image captured, the reference image which is subtracted from said analysis image corresponds to a thermal emission distribution in the detection region, as caused by at least some of the heat injected into the surface portion of the piece, for a case where said surface portion of the piece is without defects in the detection region,
wherein the reference image which is subtracted from the analysis image results from a search for best match between said analysis image and a configured model of thermal emission distribution which is used to define the case where the surface portion of the piece is without defects in the detection region, and
wherein heat is injected into the heating region by means of a laser beam directed onto said heating region for a given irradiation time.

20. The photothermal analysis assembly of claim 18, further comprising scanning means, suitable for moving the heating region within the surface portion of the piece, so as to perform a scan in said surface portion with successive positions of the heating region, the detection region being moved within the surface portion of the piece together with the heating region, so that any location in the surface portion of the piece is contained at least once in the detection region.

* * * * *